United States Patent
Krithivasan et al.

(10) Patent No.: US 11,971,111 B1
(45) Date of Patent: Apr. 30, 2024

(54) RELIEVING PRESSURE IN CRITICAL AND SUB-CRITICAL FLOW REGIMES IN BACKPRESSURE CONDITIONS

(71) Applicant: Dresser, LLC, Houston, TX (US)

(72) Inventors: Rajesh Krithivasan, St. Johns, FL (US); Richard Klimas, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/045,044

(22) Filed: Oct. 7, 2022

(51) Int. Cl.
*F16K 17/24* (2006.01)
*F16K 17/06* (2006.01)
*F16K 47/04* (2006.01)

(52) U.S. Cl.
CPC ............. *F16K 17/24* (2013.01); *F16K 17/06* (2013.01); *F16K 47/04* (2013.01); *Y10T 137/7747* (2015.04)

(58) Field of Classification Search
CPC ........ F16K 15/026; F16K 17/06; F16K 17/08; F16K 47/04; Y10T 137/774–7747
See application file for complete search history.

(56) References Cited

U.S. PATENT DOCUMENTS

| | | | | |
|---|---|---|---|---|
| 3,815,628 | A * | 6/1974 | Ferrill | F16K 17/10 137/478 |
| 5,341,838 | A * | 8/1994 | Powell | F16K 17/08 251/284 |
| 2003/0047216 | A1* | 3/2003 | Kelly | F16K 17/06 137/538 |
| 2004/0060600 | A1* | 4/2004 | Choate | F16K 37/0083 29/890.124 |
| 2007/0235670 | A1* | 10/2007 | Shindo | F16K 25/04 251/121 |
| 2022/0316620 | A1* | 10/2022 | Shindo | F16K 47/04 |

* cited by examiner

*Primary Examiner* — Robert K Arundale
(74) *Attorney, Agent, or Firm* — Mintz, Levin, Cohn, Ferris, Glovsky and Popeo, P.C.

(57) ABSTRACT

A pressure relief valve includes the following features. A housing defines an inlet and an outlet. The housing defines a flow passage between the inlet and the outlet. A seat can be defined by the housing. The seat defines a throat flow area. A plunger is configured to rest upon the seat. The plunger blocks the flow passage when in a closed position. The plunger is configured to actuate between a fully open position and the closed position. The plunger and the seat can at least partially defining a curtain flow area. A bias directs the plunger towards the seat. A ratio of the throat flow area to the curtain flow area is sized for sonic or supersonic flow velocities during critical flow conditions and subsonic velocities during subcritical flow conditions.

20 Claims, 8 Drawing Sheets

RELIEVING PRESSURE IN CRITICAL AND SUB-CRITICAL FLOW REGIMES IN BACKPRESSURE CONDITIONS

TECHNICAL FIELD

This disclosure relates to the flow geometry through a pressure relief valve.

BACKGROUND

In gas processing, pressurized gas is directed through various infrastructure components, such as pressure vessels, conduits, and storage tanks. In the event of a gas process upset, pressure within such infrastructure components can exceed a safety threshold. Unmitigated, such pressure build-up can lead to ruptured and/or exploding infrastructure components. To mitigate such a scenario, pressure relief valves are strategically placed throughout the infrastructure components. In some processing facilities, such as hydrocarbon gas processing facilities, the relieved gas cannot or should not be released directly to the outside environment. In such facilities, the pressure relief valves direct the relieved gas into a common header for proper disposal and/or venting. Pressure relief valves that relieve pressure into a header are often sized to accommodate backpressure within the header.

Various regulatory bodies provide the sizing rules for pressure relief valve capacity when backpressure is present. Such rules are directed towards flow capacity of pressure relief valves. Flow capacities can be adjusted through a variety of internal and external valve geometries to ensure a valve is "big enough", that is, able to provide a sufficient flow rate in the event the valve is triggered. Flow through a pressure relief valve is idealized as the flow through a convergent-divergent nozzle. In the critical flow regime, the mass flow through the relief valve is considered choked (or in critical flow) when the mass flow rate does not change with a change in back pressure and is independent of the backpressure. There is a transition point when the mass flow rate is dependent on the backpressure and as the backpressure increases, the mass flow rate decreases. This flow regime when the mass flow rate is dependent on the backpressure is called sub-critical flow regime. The transition point from critical to sub-critical flow is a function of the ratio of specific heats between an inlet of the valve and the outlet of the valve. In practice, such a difference in specific heats is observable through a pressure differential. For air, the transition from critical to sub-critical flow is 55%. For air this means the flow through the relief valve with a backpressure of up to 55% of inlet pressure would be the same as the flow when the backpressure is atmospheric. For a pressure relief valve set to relieve compressible fluid flow, a calculated correction factor (Kb) applies when the flow regime is sub-critical. In compressible fluids, several standards, for example, the American Petroleum Institute (API) and the International Standards Organization (ISO) indicate that the backpressure correction factor is one (1.00) in the critical flow regime. API 526 and ISO 4126 provide the theoretical formula for calculating the correction factor (Kb) in the sub critical flow regime. This assumes that the flow through a pressure safety relief valve is idealized as the flow through a convergent-divergent nozzle. For an idealized nozzle, the Mach number at the nozzle exit is equal to or greater than 1.0 as long as the exit area is equal to or greater than the throat area in the critical flow regime.

SUMMARY

This disclosure relates to technologies involving relieving pressure in critical and sub-critical flow regimes in backpressure conditions.

One embodiment described within this disclosure is a pressure relief valve with the following features. A housing defines an inlet and an outlet. The housing defines a flow passage between the inlet and the outlet. A seat can be defined by the housing. The seat defines a throat flow area. A plunger is configured to rest upon the seat. The plunger blocks the flow passage when in a closed position. The plunger is configured to actuate between a fully open position and the closed position. The plunger and the seat can at least partially define a curtain flow area. A bias directs the plunger towards the seat. A ratio of the throat flow area to the curtain flow area is sized for sonic or supersonic flow velocities during critical flow conditions and subsonic velocities during subcritical flow conditions.

In some embodiments, a guide can encircle the plunger. The guide can be arranged to maintain an alignment of the plunger during operation. Such assistance in alignment is useful for shorter plungers, for example, in some embodiments, the plunger can include a mandrel with a length to diameter ratio of greater than or equal to 0.75. In some embodiments, the guide defines flow passages that further define the curtain flow area. In some embodiments, the curtain flow area is dependent upon a stroke length of the plunger.

In some embodiments, the ratio of the throat flow area to the curtain flow area can be 0.484 or less. In some embodiments, the bias includes a spring.

One embodiment described within this disclosure is a method with the following features. A pressurized fluid flow is received by an inlet of a pressure relief valve. A plunger can be lifted from a valve seat within the pressure relief valve in response to receiving the pressurized fluid flow. A throat of the pressure relief valve lowers a pressure and increases a velocity of the fluid. The throat defines a throat flow area. An exit of a plunger increases the pressure and decreases the velocity of the fluid flow within the pressure relief valve. The plunger at least partially defines a curtain flow area. The fluid flow can be directed to a relief header by the pressure relief valve. The relief header can have a backpressure. A flow area ratio of the throat flow area to the curtain flow area can be 0.428 or less.

After a time, a pressure within a pressurized environment is decreased responsive to lifting the plunger from the valve seat. Once the pressure is sufficiently lowered, the plunger abuts to the valve seat in response to decreasing the pressure.

In some instances, the backpressure can be substantially less than 55% of a pressure at the inlet of the pressure relief valve. In such instances, a shockwave can be formed within the pressure relief valve. Increasing the velocity of the fluid flow can then involve increasing the velocity of the fluid flow to a supersonic velocity.

In some instances, an outlet pressure of the pressure relief valve is substantially at least 55% of a pressure at the inlet of the pressure relief valve. In such instances, a flowrate substantially equal to backpressure correction factor curves is maintained.

In some embodiments, alignment of the plunger is maintained by a guide encircling the plunger. This guide, in some cases, can include openings. In such cases, the fluid flow is received through the openings within the guide.

One embodiment described within this disclosure is a pressure relief system with the following features. A pressure relief valve can couple a pressurized system to a relief header. The pressure relief valve can be configured to direct fluid flow from the pressurized system to the relief header when a pressure within the pressurized system exceeds a specified threshold. The pressure relief valve includes a housing that defines an inlet and an outlet. The housing defines a flow passage between the inlet and the outlet. A seat can be defined by the housing. The seat defines a throat flow area. A plunger is configured to rest upon the seat. The plunger can block the flow passage when in a closed position. The plunger can be configured to actuate between a fully open position and the closed position. The plunger and the seat can at least partially define a curtain flow area. A bias directs the plunger towards the seat. A ratio of throat flow area to curtain flow area can be sized for supersonic flow velocities during critical flow conditions and subsonic velocities during subcritical flow conditions.

In some embodiments, a guide can encircle the plunger. The guide can be arranged to maintain an alignment of the plunger during operation. Such embodiments are especially useful in embodiments with a short plunger, for example, in some embodiments, the plunger can include a mandrel with a length to diameter ratio of greater than or equal to 0.75. Shorter plungers are, in some embodiments, useful as the curtain flow area can be dependent upon a stroke length of the plunger. In some embodiments, the guide can define flow passages that further define a curtain flow area. In some embodiments the ratio of the throat flow area to the curtain flow area is 0.428 or less. In some embodiments, the bias includes a pilot system.

BRIEF DESCRIPTION OF THE FIGURES

These and other features will be more readily understood from the following detailed description taken in conjunction with the accompanying drawings, in which.

DETAILED DESCRIPTION

Figure 1:
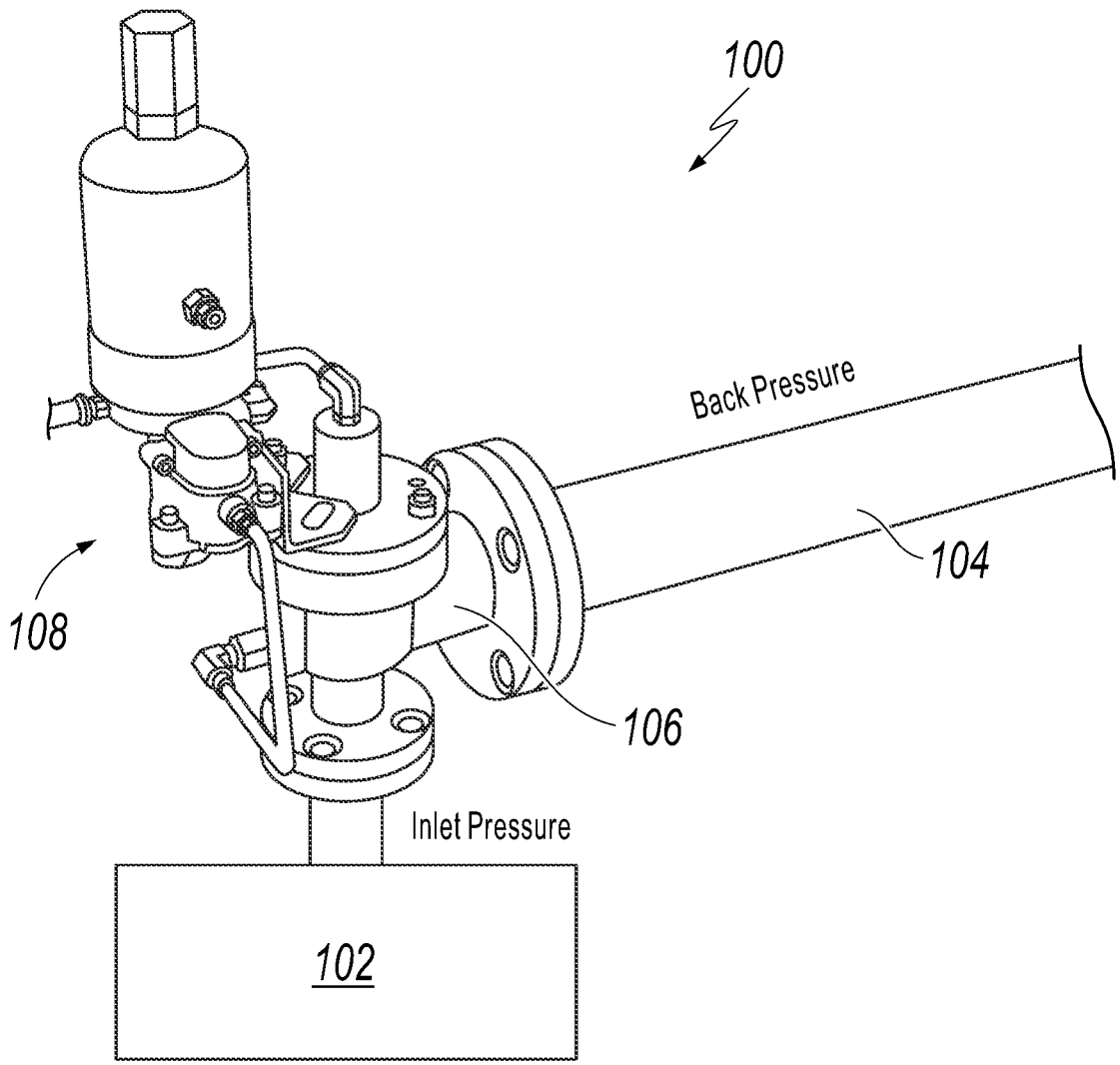
FIG. 1 is a perspective view of an example pressure relief system.

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

The flow through a pressure relief valve is relatively complex compared to a simple ideal 2D nozzle. This results in a flow regime that deviates from idealized 2D nozzle contemplated by the API and ISO standards. The flow through a safety relief valve involves a convergent-divergent nozzle, a nozzle exit area along with a 90-degree bend, an expansion volume, and a valve exit area. As a result, many safety relief valves perform substantially worse than the ideal nozzle used in the calculations per API 526 and ISO 4126. For this reason, many safety relief valves are purposely oversized, resulting in bulkier and more expensive valves being used in facilities than calculations indicate.

This disclosure related to a pressure relief valve that performs similar to the ideal nozzle used in API 526 and ISO 4126. The pressure relief valve includes a housing defining an inlet and an outlet. The housing defines a flow passage between the inlet and the outlet. A seat defines a throat flow area. A plunger is configured to rest upon the seat. The plunger blocks the flow passage when in a closed position. The plunger is configured to actuate between a fully open position and the closed position. The plunger and the seat at least partially define a curtain flow area. A ratio of throat flow area to curtain flow area is sized for sonic or supersonic flow velocities during critical flow conditions and subsonic velocities during subcritical flow conditions. Such characteristics allow the valve to behave as an ideal nozzle. As a valve with such characteristics behaves as an ideal nozzle, smaller (and therefore cheaper) valves can be used in comparison to valves with traditional flow characteristics.

FIG. 1 is a perspective view of an example pressure relief system 100. As shown, the pressure relief system 100 includes a pressurized system 102 used in the processing and transport of pressurized fluids, such as pressurized gases. The pressurized system 102 can include a pressure vessel, a flow conduit, or similar pressurized fluid infrastructure. In some embodiments, the pressure relief system 100 also includes a relief header 104. Relief headers 104 are often used in embodiments where a pressurized fluid within the pressurized system 102 cannot or should not be vented directly to the atmosphere. For example, in some embodiments, the pressurized fluid includes hydrocarbon gases, and the relief header 104 is a flare header that directs vented hydrocarbons to a flare for safe disposal. In some embodiments, the relief header is arranged to receive fluid from multiple sources in the event the pressurized system 102 becomes over-pressurized and pressure must be relieved from the pressurized system.

A pressure relief valve 106 couples the pressurized system 102 to the relief header 104. The pressure relief valve is configured to direct fluid flow from the pressurized system 102 to the relief header 104 when a pressure within the pressurized system 102 exceeds a specified threshold. In some embodiments, the specified threshold is determined by a pressure reading of the pressurized system. In some embodiments, the specified threshold is determined per regulatory requirements and/or expected operating parameters of the pressurized system. In the illustrated embodiment, a pilot-style pressure relief valve is illustrated; however, the subject matter of this disclosure is applicable to other pressure relief style valves, for example, poppet-style pressure relief valves or other spring-biased pressure relief valves.

Figure 2A:
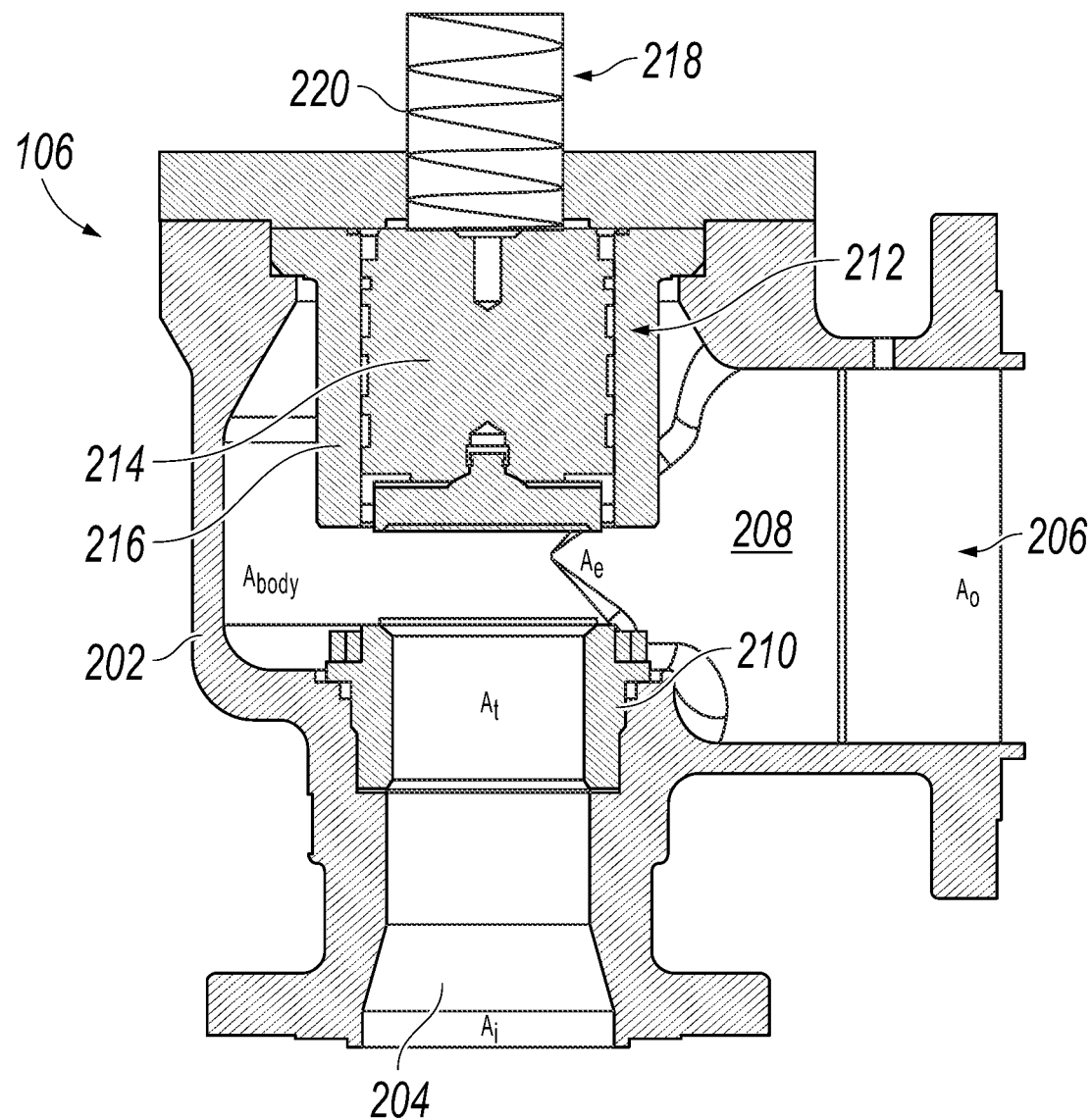
FIG. 2A is a side cross-sectional diagram of an example pressure relief valve.
Figure 2B:
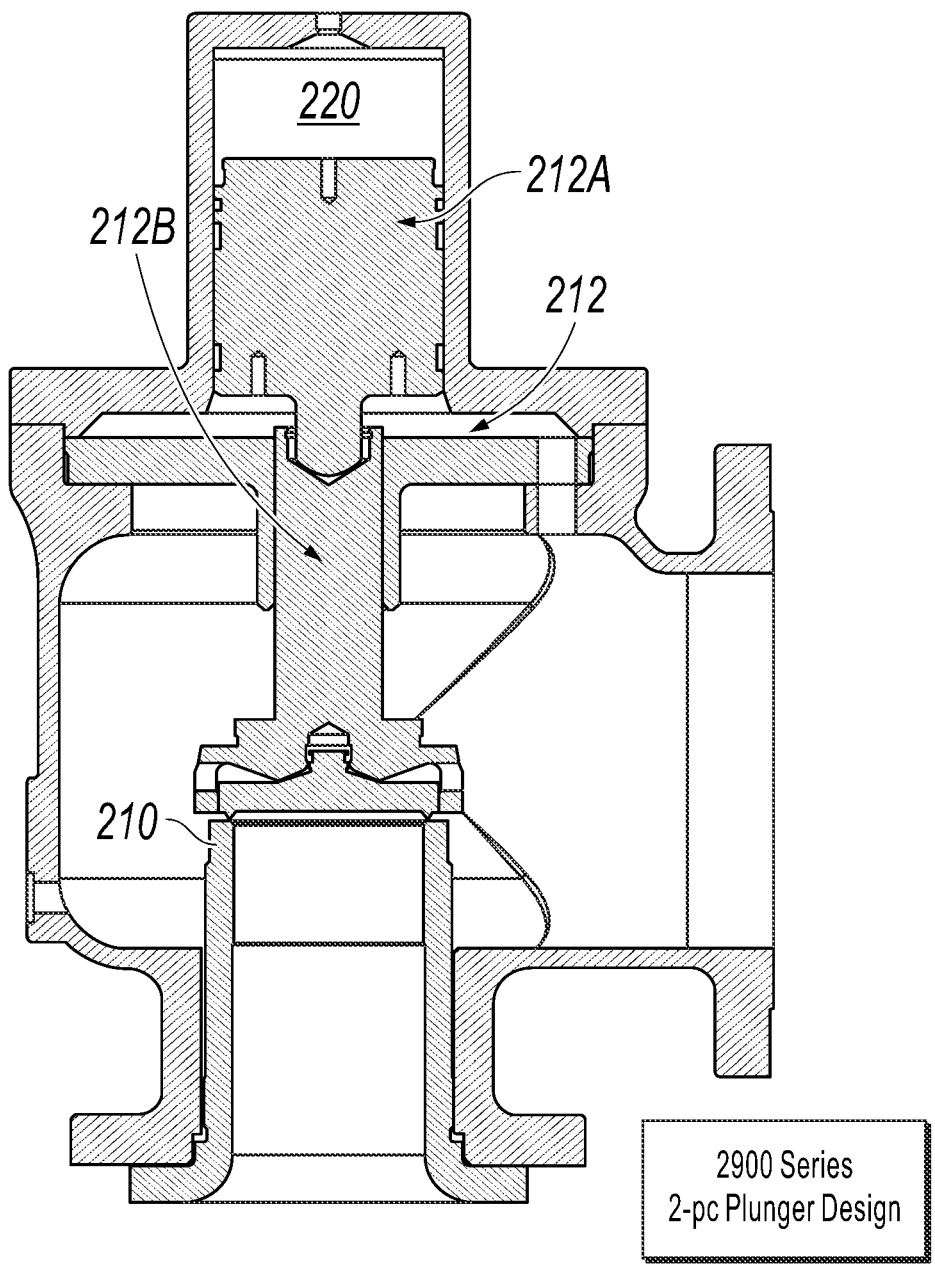
FIG. 2B is a side cross-sectional diagram of an example pressure relief valve.

FIGS. 2A-2B are side cross-sectional diagram of example pressure relief valves. The pressure relief valve 106 includes a housing 202 that defines an inlet 204 and an outlet 206. The housing defines a flow passage 208 between the inlet 204 and the outlet 206. The inlet 204 is fluidically coupled to the pressurized system 102. Within the housing 202 is a seat 210 that defines a throat flow area, which is a cross-sectional area of a portion of the flow passage defined by the seat 210. In some embodiments, the seat 210 is defined at least partially by the housing 202. In some embodiments, the seat 210 is a separate insert that is supported and retained by the housing 202. Such an embodiment allows for a single housing to be used in different "sized" valves.

A plunger 212 is configured to rest upon the seat when the valve is a closed position. When in the closed position, the plunger blocks the flow passage. The plunger is configured to actuate between a fully open position (as shown in FIG. 2A) and the closed position. The plunger 212 and the seat 210 at least partially define a curtain flow area. That is, the plunger 212 and the seat bound the flow passage. In other words, the curtain flow area is dependent upon a stroke length (travel distance) of the plunger 212. As shown in FIG. 2B, the plunger 212 can include two pieces coupled to each other. A top plunger 212A can be configured to receive a force from the bias 218 and the bottom plunger 212B can be configured to seal against the seat 210 in the closed position. In some embodiments, the plunger includes a mandrel 214. In some embodiments, the mandrel 214 has a length to diameter ratio of greater than or equal to 0.75. Such a ratio can increase a curtain flow area by providing a shorter mandrel length, which allows for a greater stroke length during operation.

In some embodiments, the pressure relief valve 106 includes a guide 216 encircling the plunger 212. The guide is arranged to maintain an alignment of the plunger across an entire stroke length of the plunger 212 during operation. Examples of such guides are discussed in greater detail later within this disclosure.

A bias 218 directs the plunger 212 towards the seat 210. A strength of the bias 218 determines a cracking (opening) pressure of the valve 106. In some embodiments, the bias is field adjustable, meaning that the set pressure of the valve can be adjusted by a technician at the installation site. As previously discussed, in some embodiments, the bias 218 includes the pilot system 108 (FIG. 1). Alternatively or in addition, in some embodiments, the bias includes a spring 220.

Figure 3:
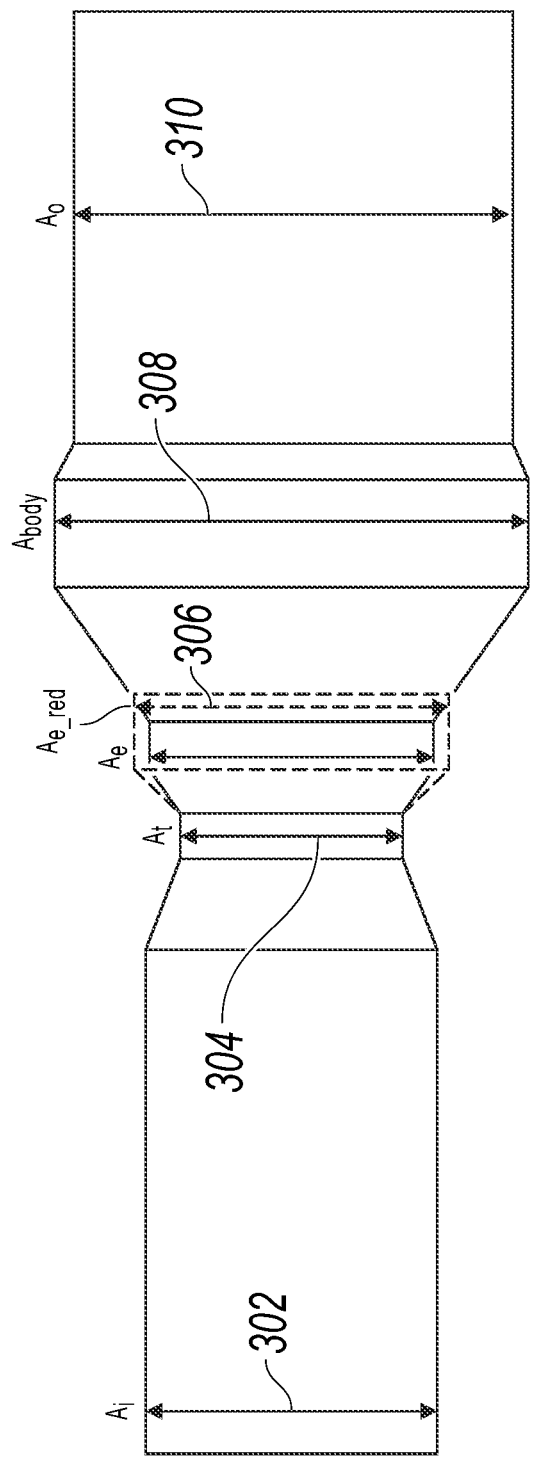
FIG. 3 is a schematic diagram of cross sectional flow areas within the example pressure relief valve.

Flow capacity through a valve can be a function of, at least in part, a geometry of the flow passage defined by the valve. In general, such geometries can be simplified into a 2D representation of the various flow areas through the flow passage 208. FIG. 3 is a schematic diagram of cross sectional flow areas of the flow passage 208 defined by the example pressure relief valve 106. The flow passage 208 has a variable cross-section across a length of the flow passage 208. The first cross-sectional area is the inlet cross sectional area 302 defined by the housing 202. The next cross-sectional area is the throat cross-sectional area 304 defined by the seat 210. Just downstream of the throat cross-sectional area is the curtain cross-sectional flow area 306 defined by both the seat 210 and the plunger 212. Next is a valve body cross-sectional area 308. This is the largest cross-sectional area and is defined by the valve housing 202. Finally, the fluid flow exits through the outlet cross-sectional area 310 defined by the outlet 206.

In some embodiments, the flow passage 208 is configured to allow pressurized fluid to exit the pressurized system under a variety of conditions. For example, in situations where backpressure is present in the relief header. A presence and amount of backpressure has an impact on a flowrate of the fluid flow. In general, the more backpressure is present in the relief header, the lower the flow rate. When the backpressure has an insignificant (for example, less than 10%) impact on a flowrate through the pressure relief valve, the flow is said to be in a critical flow state. In instances when the backpressure has a more significant impact, the flow is said to be in a subcritical flow state. In some embodiments, flow transitions from critical flow to subcritical flow when the backpressure within the relief header is substantially 55% of the pressure relief valve cracking pressure (Plus or minus 5%). The backpressure necessary to change the flow regime between critical and subcritical flow is somewhat dependent on the gas in the fluid flow, temperature, and other factors.

Returning to FIG. 3, in some embodiments, a ratio of throat flow area 304 to curtain flow area 306 is sized for sonic or supersonic flow velocities during critical flow conditions and subsonic velocities during subcritical flow conditions. That is, during critical flow conditions, the fluid flow reaches velocities greater than or equal to Mach 1. To achieve such velocities, a ratio of the throat area 304 to the curtain area 306 is set, for example, to be 0.484 or less. In some embodiments, the ratio of the throat area 304 to the curtain area 306 is set to be 0.428 or less. The ratio is dependent upon cracking pressure of the pressure relief valve, the composition of the fluid, and the temperature of the fluid, as such, the provided ratios are simply provided as examples.

Figure 4C:
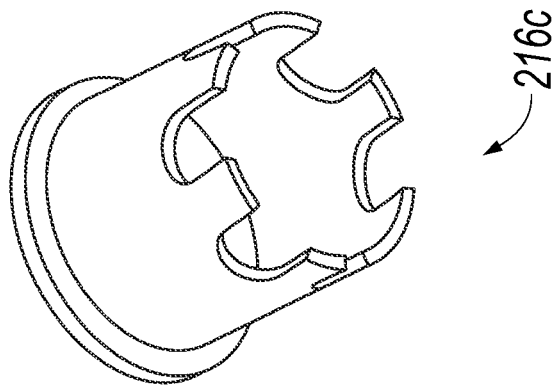
FIGS. 4A-4C are examples of skirts that can be used within the example pressure relief valve.
Figure 4B:
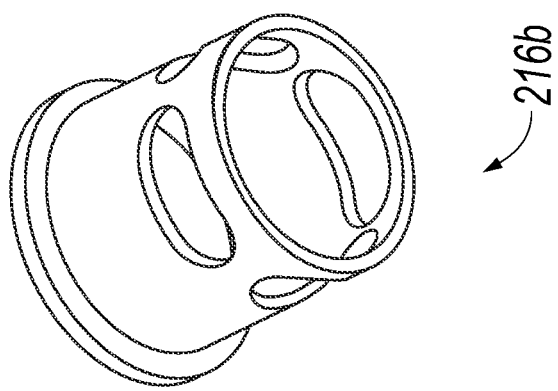
Figure 4A:
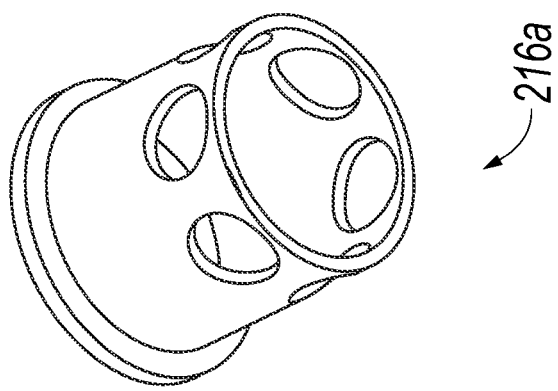

In some embodiments, the stroke length of the plunger 212 (FIG. 2) is of sufficient length as to lift a lower end of the plunger 212 (the end configured to abut the seat 210) past the lower end of the guide 216. In such embodiments, the guide 216 partially defines the curtain flow area 306. FIGS. 4A-4C are examples of guides that can be used within the example pressure relief valve 106. In such embodiments, the guide 216 may define flow passages (216a, 216b, 216c). In such embodiments, the guide's flow passages (216a, 216b, 216c) further define the curtain flow area 306.

Figure 5:
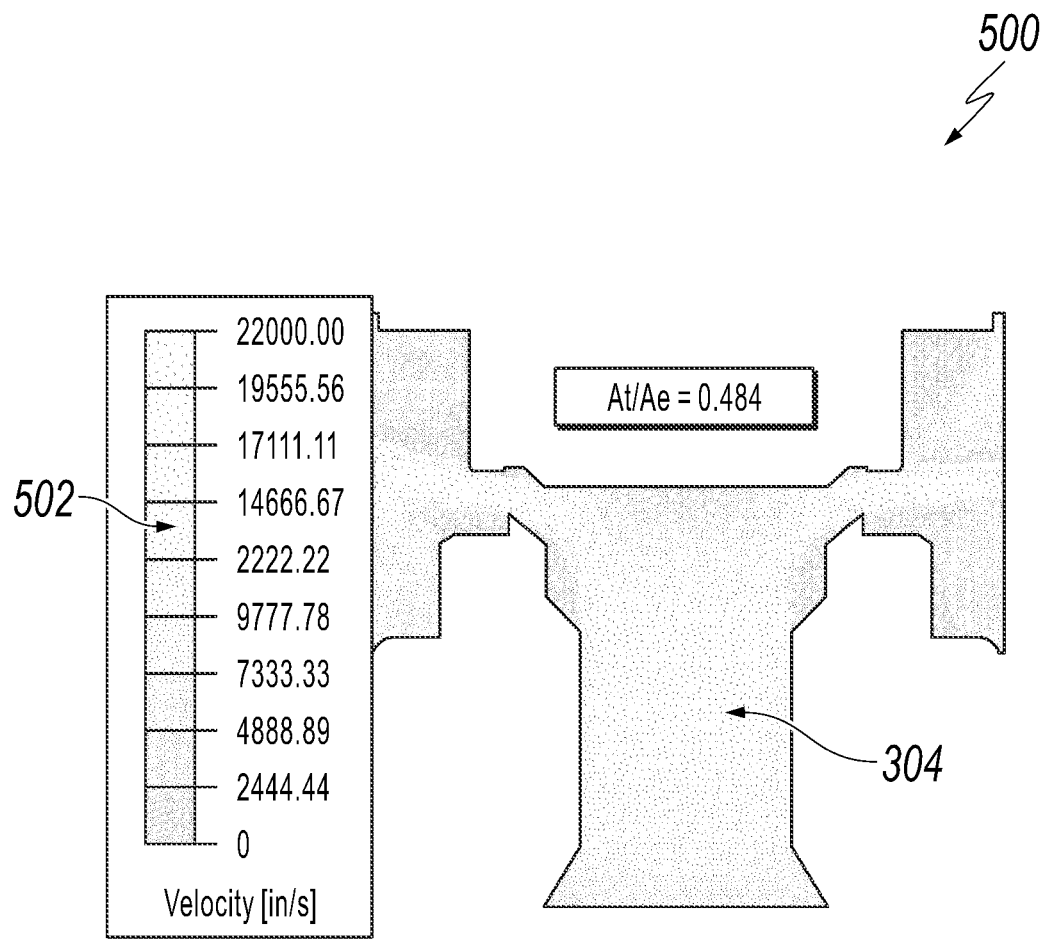
FIG. 5 is a computational fluid dynamics simulation illustrating flow velocities through the example pressure relief valve.

Now that the importance of a ratio of the throat area 304 to the curtain area 306 within the example valve 106 has been discussed, FIG. 5 shows a computational fluid dynamics simulation 500 illustrating flow velocities through the example pressure relief valve 106 during the critical flow phase. As can be seen from the simulation 500, a flow velocity reaches a sonic velocity 502 within the throat area 304. For the illustrated embodiment, the throat area to curtain area is 0.484.

Figure 6:
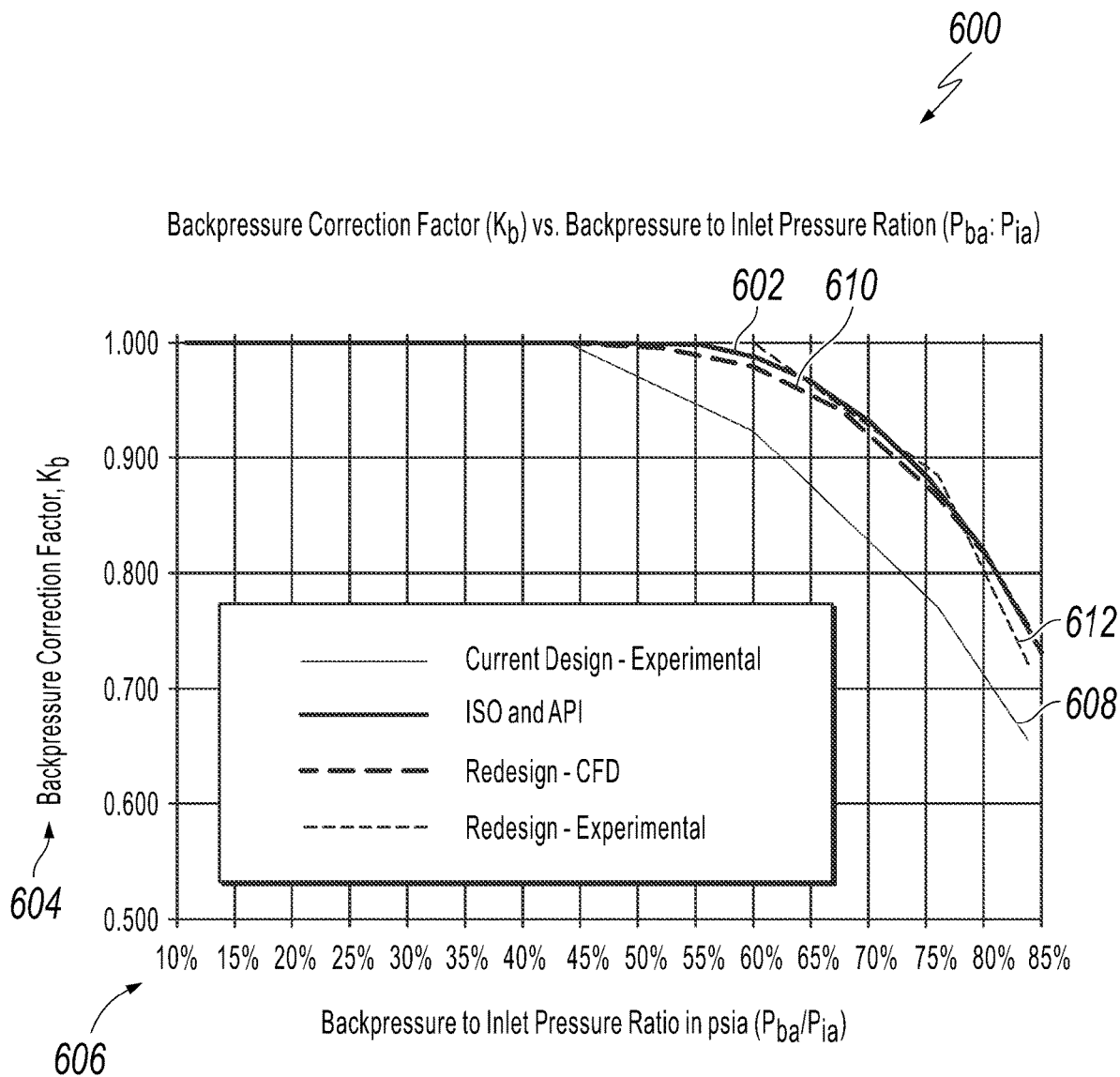
FIG. 6 is a plot of an example ideal backpressure curve.

FIG. 6 is a plot 600 of an example ISO/API backpressure curve 602. The plot 600 illustrates a correction factor 604 over backpressure 606. The first curve 608 illustrates correction factors that are typical of a valve design, while the ISO/API curve 602 is an ideal curve developed by ISO and API. As can be seen, a typical valve curve 608 is offset from the ISO/API curve 602. A valve designed with the typical valve curve 608 would need to be larger to accommodate necessary flow rates during subcritical flow scenarios.

A benefit of having a ratio of the throat area 304 to the curtain area 306 configured to accelerate the fluid flow to sonic velocities during critical flow situations, is that flow rates decline at an ideal rate, that is, the correction factor (kb) matches calculated curves such as the ISO/API curve 602. In other words, a relief valve configured to provide sonic or supersonic flow velocities is able to provide greater flowrates (that is, mass-flow rates) during subcritical conditions. This can be seen with the third curve 610, based on the computational fluid dynamics simulation 500, and the fourth curve 612 based upon testing of the example pressure relieve valve 106.

Figure 7:
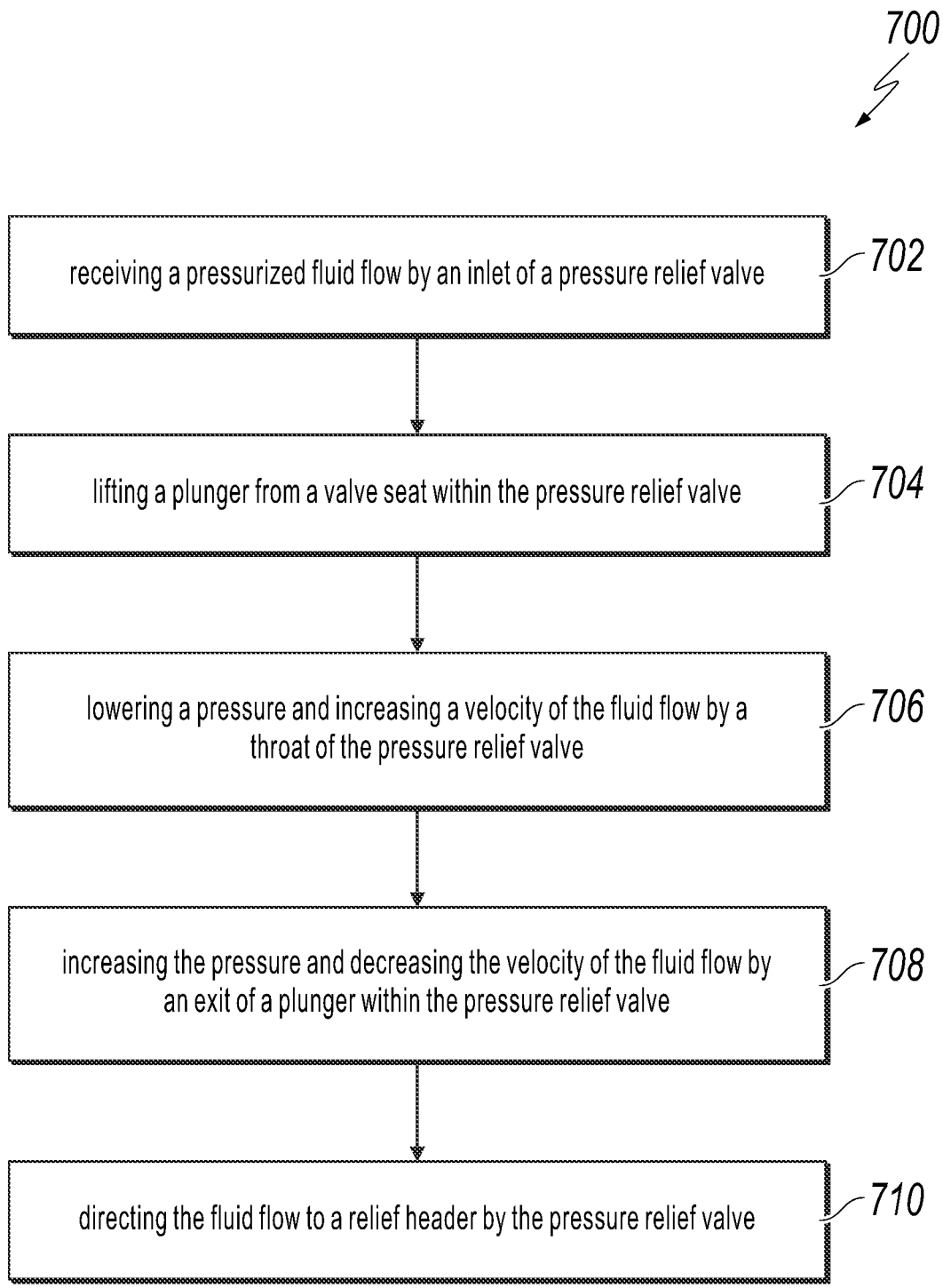
FIG. 7 is a flowchart of a method that can be used with aspects of this disclosure.

In the field, the valve can be categorized as going through several discreet steps during operations. FIG. 7 illustrates such steps in flowchart of a method 700. At 702, a pressurized fluid flow is received by the inlet 204 (FIG. 2) of the pressure relief valve 106. At 704, the plunger 212 is lifted from the valve seat 210 responsive to receiving the pressurized fluid flow. Such an event occurs, for example, when the pressurized fluid exceeds a set-point of the pressure relief valve 106. In some embodiments, alignment of the plunger is maintained by a guide, or skirt, encircling the plunger 212. In some embodiments, the guide defines openings (216a, 216b, 216c) through which the fluid flows.

At 706, the fluid flow pressure is lowered and the velocity is increased by the seat 210 of the pressure relief valve 106. The seat 210 defines a throat flow area 304. At 708, the fluid flow the pressure is increased and the velocity is decreased of by an exit of the plunger 212. The plunger 212 at least partially defines a curtain flow area. At 710, the fluid flow is directed to the relief header 104 by the pressure relief valve 106. The relief header has a backpressure. In some embodiments, a flow area ratio of the throat flow area to the curtain flow area is 0.484 or less. In some embodiments, the ratio is 0.428 or less.

In instances the backpressure (outlet pressure) is substantially less than 55% of a pressure at the inlet of the pressure relief valve (plus or minus 5%), a shockwave is formed within the pressure relief valve. In such situations, the velocity of the fluid flow is increased to a sonic or supersonic velocity.

In instances where the backpressure (outlet pressure) of the pressure relief valve is substantially at least 55% of a pressure at the inlet of the pressure relief valve (plus or minus 5%) a flowrate substantially equal to backpressure correction factor curves, such as those illustrated in FIG. 6, is maintained.

Regardless of the flow velocities, after a duration of time, the pressure within the pressurized environment is decreased responsive to lifting the plunger from the valve seat. Once the pressure has decreased past a specified threshold, for example, 95% of the lifting pressure of the plunger 212, the plunger abuts to the valve seat in response to the decreased pressure.

While this disclosure contains many specific embodiment details, these should not be construed as limitations on the scope of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A pressure relief valve comprising:
a housing defining an inlet and an outlet, the housing defining a flow passage between the inlet and the outlet;
a seat defined by the housing, the seat defining a throat flow area;
a plunger configured to rest upon the seat, the plunger blocking the flow passage when in a closed position, the plunger configured to actuate between a fully open position and the closed position, the plunger and the seat at least partially defining a curtain flow area; and
a bias directing the plunger towards the seat,
wherein a ratio of throat flow area to curtain flow area, when the plunger is in the fully open position, is sized to cause sonic or supersonic flow velocities during critical flow conditions and subsonic velocities during subcritical flow conditions.

2. The pressure relief valve of claim 1, further comprising a guide encircling the plunger, the guide arranged to maintain an alignment of the plunger during operation.

3. The pressure relief valve of claim 2, wherein the guide defines flow passages, downstream of the plunger, that further define the curtain flow area.

4. The pressure relief valve of claim 1, wherein the curtain flow area is dependent upon a stroke length of the plunger.

5. The pressure relief valve of claim 1, wherein the ratio of the throat flow area to the curtain flow area is 0.484 or less.

6. The pressure relief valve of claim 1, wherein the plunger comprises a mandrel, wherein the mandrel comprises a length to diameter ratio of greater than or equal to 0.75.

7. The pressure relief valve of claim 1, wherein the bias comprises a spring.

8. A method comprising:
receiving a pressurized fluid flow by an inlet of a pressure relief valve;
lifting a plunger from a valve seat within the pressure relief valve responsive to receiving the pressurized fluid flow;
lowering a pressure and increasing a velocity of the fluid flow by a throat of the pressure relief valve, the throat defining a throat flow area;
increasing the pressure and decreasing the velocity of the fluid flow by an exit of a plunger within the pressure relief valve, the plunger at least partially defining a curtain flow area; and
directing the fluid flow to a relief header by the pressure relief valve, the relief header having a backpressure, wherein a flow area ratio of the throat flow area to the curtain flow area is 0.428 or less.

9. The method of claim 8, wherein the backpressure is substantially less than 55% of a pressure at the inlet of the pressure relief valve, the method further comprising:
forming a shockwave within the pressure relief valve by components of the pressure relief valve, wherein increasing the velocity of the fluid flow comprises increasing the velocity of the fluid flow to a supersonic velocity.

10. The method of claim 8, wherein an outlet pressure of the pressure relive valve is substantially at least 55% of a pressure at the inlet of the pressure relief valve, the method further comprising:
maintaining a flowrate, by the pressure relief valve, substantially equal to backpressure correction factor curves.

11. The method of claim 8, further comprising:
maintaining alignment of the plunger by a guide encircling the plunger.

12. The method of claim 11, further comprising:
receiving the fluid flow through openings within the guide, the openings being downstream of the plunger.

13. The method of claim 8, further comprising:
decreasing a pressure within a pressurized environment by the pressure relief valve responsive to lifting the plunger from the valve seat; and
abutting the plunger to the valve seat responsive to decreasing the pressure.

14. A pressure relief system comprising:
a pressurized system;
a relief header; and
a pressure relief valve coupling the pressurized system to the relief header, the pressure relief valve configured to direct fluid flow from the pressurized system to the relief header when a pressure within the pressurized system exceeds a specified threshold, the pressure relief valve comprising:
a housing defining an inlet and an outlet, the housing defining a flow passage between the inlet and the outlet;
a seat defined by the housing, the seat defining a throat flow area;
a plunger configured to rest upon the seat, the plunger blocking the flow passage when in a closed position, the plunger configured to actuate between a fully open position and the closed position, the plunger and the seat at least partially defining a curtain flow area; and
a bias directing the plunger towards the seat,
wherein a ratio of throat flow area to curtain flow area, when the plunger is in the fully open position, is sized to cause supersonic flow velocities during critical flow conditions and subsonic velocities during subcritical flow conditions.

15. The pressure relief system of claim 14, further comprising a guide encircling the plunger, the guide arranged to maintain an alignment of the plunger during operation.

16. The pressure relief system of claim 15, wherein the guide defines flow passages, downstream of the plunger, that further define a curtain flow area.

17. The pressure relief system of claim 14, wherein the curtain flow area is dependent upon a stroke length of the plunger.

18. The pressure relief system of claim 14, wherein the ratio of the throat flow area to the curtain flow area is 0.428 or less.

19. The pressure relief system of claim 14, wherein the plunger comprises a mandrel, wherein the mandrel comprises a length to diameter ratio of greater than or equal to 0.75.

20. The pressure relief system of claim 14, wherein the bias comprises a pilot system.

* * * * *